US006645273B2

(12) United States Patent
Wakamatsu et al.

(10) Patent No.: US 6,645,273 B2
(45) Date of Patent: Nov. 11, 2003

(54) METHOD FOR REMOVING IMPURITY CONTENTS IN THE AIR

(75) Inventors: Hidetoshi Wakamatsu, Tokyo (JP); Mikio Matsuki, Tokyo (JP); Norio Tanaka, Tokyo (JP); Hiroshi Ogata, Tokyo (JP)

(73) Assignee: Oki Electric Industry Co, LTD, Tokyo (JP)

( * ) Notice: Subject to any disclaimer, the term of this patent is extended or adjusted under 35 U.S.C. 154(b) by 0 days.

(21) Appl. No.: 10/326,111

(22) Filed: Dec. 23, 2002

(65) Prior Publication Data

US 2003/0089242 A1 May 15, 2003

Related U.S. Application Data

(63) Continuation of application No. 09/734,558, filed on Dec. 13, 2000, now Pat. No. 6,497,757.

(30) Foreign Application Priority Data

Jul. 28, 2000  (JP) ........................................ 2000-228548

(51) Int. Cl.[7] ........................... B01D 47/06; B01D 53/14
(52) U.S. Cl. ............................. 95/199; 95/211; 95/214; 95/224; 96/290; 96/297; 96/361; 96/363; 96/364
(58) Field of Search .......................... 95/211, 214, 224, 95/199; 96/290, 296, 297, 363, 364, 361, 322

(56) References Cited

U.S. PATENT DOCUMENTS

| 1,222,541 | A |  | 4/1917 | Donham |
| 2,057,579 | A |  | 10/1936 | Kurth |
| 2,110,203 | A |  | 3/1938 | Crawford |
| 3,785,127 | A |  | 1/1974 | Mare |
| 4,397,662 | A |  | 8/1983 | Bloomer |
| 4,544,380 | A |  | 10/1985 | Itou et al. |
| 4,604,108 | A |  | 8/1986 | Cotton, Jr. |
| 4,926,620 | A |  | 5/1990 | Donle |
| 5,620,503 | A |  | 4/1997 | Miller et al. |
| 5,890,367 | A |  | 4/1999 | You et al. |
| 6,059,866 | A |  | 5/2000 | Yamagata et al. |
| 6,387,165 | B1 | * | 5/2002 | Wakamatsu |
| 6,451,096 | B1 | * | 9/2002 | Kim |
| 6,497,757 | B2 | * | 12/2002 | Wakamatsu et al. |
| 2002/0011150 | A1 |  | 1/2002 | Wakamatsu et al. |

FOREIGN PATENT DOCUMENTS

| JP | 07-060044 | 3/1995 |
| JP | 2000-033221 | 2/2000 |

* cited by examiner

Primary Examiner—Duane S. Smith
(74) Attorney, Agent, or Firm—Rabin & Berdo, P.C.

(57) ABSTRACT

A method for removing impurity substances in air flowing in a flow passage includes filtering the air in a first filter for removing solid substances; cooling the air in a first cooler to not higher than its dew-point temperature; capturing gaseous substances in the air in a wet-type impurity removing apparatus; cooling the air in a second cooler; and filtering in a second filter. The wet-type impurity removing apparatus includes a first liquid atomizer having two pluralities of nozzle ports for spraying, arranged mutually spaced apart and facing each other in the direction of the air flow passage; first and second condensing and capturing assemblies located across the first atomizer and spaced apart from each other, with the first assembly being upstream and the second assembly being downstream from the first atomizer; a second atomizer for capturing any remaining gaseous substances in the air; and a third condensing and capturing assembly.

10 Claims, 2 Drawing Sheets

Fig.2

| CHEMICAL SUBSTANCES | OUTSIDE AIR | Ⓐ | Ⓑ | Ⓒ | Ⓓ | REMOVAL RATE(%) OF CHEMICAL SUBSTANCE |
|---|---|---|---|---|---|---|
| Na⁺ | 260 | 18 | 6 | N.D | N.D | 100.0 |
| K⁺ | 110 | 18 | 8 | 8 | N.D | 100.0 |
| Ca²⁺ | 18 | 7 | 1 | 2.2 | 2.8 | 84.4 |
| Mg²⁺ | 14 | 13 | 2.2 | 6 | 1.2 | 91.4 |
| B⁺ | 8 | — | — | — | 0.5 | 93.8 |
| NH₄⁺ | 16000 | 8000 | 6000 | 1800 | 140 | 99.1 |
| Cl⁻ | 500 | 260 | 60 | 50 | 9 | 98.2 |
| NO₂⁻ | 500 | 600 | 100 | 120 | 23 | 96.2 |
| NO₃⁻ | 1500 | 240 | 100 | 170 | 10 | 99.3 |
| SO₄²⁻ | 7000 | 1900 | 270 | 500 | 30 | 99.6 |

CONCENTRATION UNIT : ng/m3

(DEFINITION OF REMOVAL RATE) REMOVAL RATE OF CHEMICAL SUBSTANCE= (1−(CONCENTRATION AT OUTLET Ⓓ OF FILTER 22 ÷ CONCENTRATION IN OUTSIDE AIR)) × 100(%) ⋯(1)

METHOD FOR REMOVING IMPURITY CONTENTS IN THE AIR

This application is a continuation of U.S. application Ser. No. 09/734,558, filed Dec. 13, 2000, now U.S. Pat. No. 6,497,757, which issued on Dec. 24, 2002.

BACKGROUND OF THE INVENTION

1. Field of the Invention

The present invention related to impurity-removing apparatus for effectively removing solid, chemical impurity substances besides gaseous impurity substances in the air, and more particularly concerns impurity-removing apparatus suitable for use in the semiconductor fabrication process.

2. Related Art

If there are impurities, such as dust particles in the atmosphere in the manufacturing process of semiconductor devices, such as LSIs, they cause variation or deterioration in the electrical characteristics of the semiconductor devices. For this reason, the filtered air is used for the atmospheric air in the semiconductor fabrication process to improve the reliability of the electrical characteristics of the semiconductor devices and to prevent a decrease in production yield in the fabrication process. Or, the exiting air from the clean room in the semiconductor fabrication process is cleaned and returned to the clean room.

Examples of the impurity-removing apparatus for cleaning the air are disclosed in Japanese Patent Laid-Open Publication Nos. Hei 7-60044 and 2000-33221.

According to those impurity-removing apparatuses, by using wet-type removing means for atomizing a liquid to capture gaseous impurity substances, they can be removed from at a relatively high removal rate.

It ought to be noted that in addition to gaseous impurities, the air contains dust particles other than chemical substances and particles of chemical substances. Being effective in collecting dust particles other than chemical substances, the dry filter may be incorporated in the prior-art impurity-removing apparatuses mentioned above to effectively remove gaseous impurity substances dust particles other than chemical substances.

However, with a dry filer mounted in the conventional impurity-removing apparatus, it is impossible to effectively remove particles of chemical contents, such as Na or K. Therefore, there has been demand for impurity-removing apparatus capable of effectively removing particles of chemical substances.

SUMMARY OF THE INVENTION

To solve the above problem, the present invention adopts the following configurations.

According to one aspect of impurity-removing apparatus of the present invention, basically comprises a housing defining a flow passage guiding the air to be treated; a first filter, located in the flow passage, for removing solid particles contained in the air; first cooling means, located downstream from the first filter in the flow passage, for cooling the air to be treated below a dew-point temperature; a wet-type removing mechanism for capturing gaseous substances in the air cooled below a dew-point temperature; second cooling means, located downstream from the wet-type removing mechanism in the flow passage, for cooling the air to not higher than its dew-point temperature to condense an atomized liquid containing the gaseous substances remaining in the air; and a second filter located downstream from the second cooling means in the flow passage and using a material denser than that of the first filter.

The above-mentioned wet-type removing mechanism includes first capturing-liquid atomizing means for atomizing a capturing liquid for capturing gaseous substances in the air cooled below a dew-point temperature, the first atomizing means having a plurality of atomizing nozzle ports mutually spaced apart and facing each other in the direction of the flow passage; first and second condensing and capturing means for capturing an atomized liquid containing the gaseous substances, the first and second condensing and capturing means being located across the first atomizing means and spaced apart from each other, the first capturing means upstream from and the second capturing means downstream from the first atomizing means.

In another aspect of the impurity-removing apparatus the present invention, by realizing the above-mentioned configuration, more specifically, only after making a combination of the wet-type removing mechanism, the first and second filters, and the first and second cooling means, has it become possible to remove not only dust and gaseous substances and also particles of chemical substances at a high removal rate.

Regarding to the improved removal rate of particles of chemical substances, it is considered that the good effects are considered as resulting from the way in which the first capturing-liquid atomizing means sprays the capturing liquid in opposite directions from the ports spaced apart from each other and facing each other in the direction of the flow passage.

In yet another aspect, it is possible for the first and second atomizing means to spray the same or mutually different capturing liquids.

The first atomizing means may spray a capturing liquid, which is alkaline or acid, to neutralize an aqueous solution of gaseous impurity substances to be removed, which is acid or alkaline, while the second atomizing means may spray a rinsing water, such as demineralized water.

Or, the first atomizing means may spray a capturing liquid, which is alkaline or acid and the second atomizing means may spray a capturing liquid, which is acid or alkaline, in other words, opposite in character to the liquid sprayed from the first atomizing means.

Further, the first atomizing means may spray industrial water, well water or city water, which is relatively cheap, and the second atomizing means may spray more expensive demineralized water, thereby saving running cost of the impurity-removing apparatus.

In an additional aspect, as the condensing and capturing means, well-known eliminators may be used, which are subject to relatively smaller pressure loss.

In a further aspect, the average particle size or the average diameter of the capturing liquid atomized by each of the atomizing means is desirably 10 $\mu$m to 100 $\mu$m.

In another aspect, as cooling means, a well-known condenser coil may be used.

In a still another aspect, from a viewpoint of running-cost saving, the capturing liquid sprayed from the atomizing means is preferably recirculated between the atomizing means and the condensing and capturing means.

BRIEF DESCRIPTION OF THE DRAWINGS

FIG. 2 is a diagram for explaining the effects of impurity removal of the impurity-removing apparatus according to the present invention.

DESCRIPTION OF PREFERRED EMBODIMDNT

Figure 1:
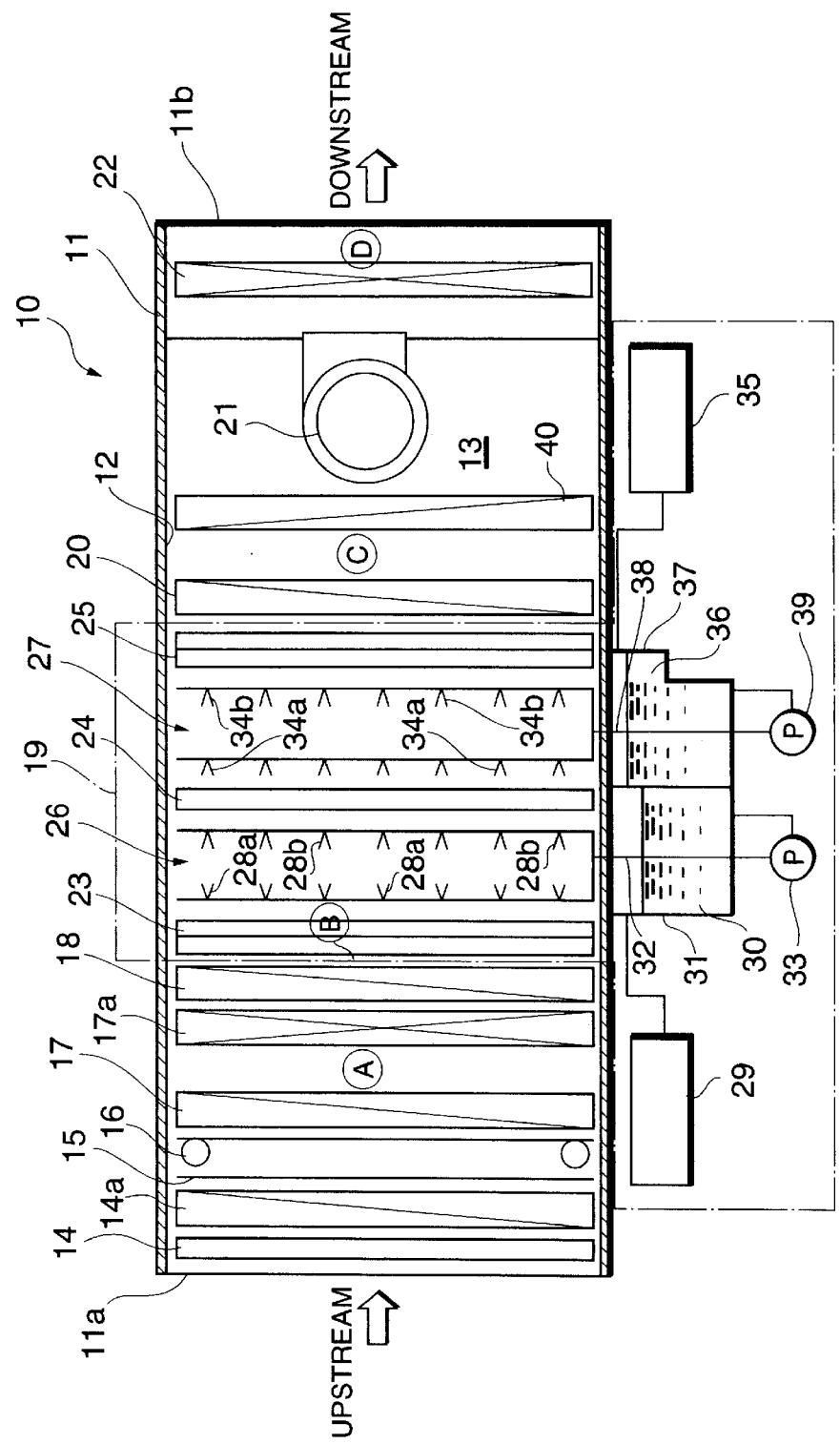
FIG. 1 is a longitudinal sectional view schematically showing the impurity-removing apparatus according to the present invention.

A detailed description will be made of a preferred embodiment illustrated in the accompanying drawings.

<Embodiment>

FIG. 1 shows an embodiment of the impurity-removing apparatus according to the present invention. An impurity-removing apparatus according to the present invention is provided with a cylindrical housing 11 open at both ends, which has a rectangular cross section, for example. The housing 11 defines an air flow passage 13, extending from one open end 11a to the other open end 11b, by an internal wall 12 of the housing.

In the air flow passage 13 in the housing 11, there are sequentially arranged a pre-filter 14 for removing foreign substances, such as sand and dust, in the air flowing from the one open end 11a toward the other open end 11b; a pre-heating coil 14a for heating the air flow; a chuck damper 15 for adjusting a flow rate of the air passing through the air flow passage 13; an auto-roll filter 16 for removing remaining foreign substances; a first filter 17; a heating coil 17a; first cooling means 18; a wet-type removing mechanism 19; second cooling means 20; re-heating means 40; a blower 21 and a second filter 22 in this order.

The blower 21, provided in the air flow passage 13, discharges the air from the other open end 11b of the housing 11. Due to the blowing of air by the blower 21, the external air is guided into the flow passage 13 from the one open end 11a toward the other open end 11b. The air flow rate in the flow passage 13 is suitably adjusted by the chuck damper 15.

The air sent from the open end 11a as the intake port into the housing 11 is subjected to pre-treatment to remove chiefly solid foreign substances, such as sand and dust, by dry filters, the pre-filter 14 and the auto-roll filter 16.

With the auto-roll filter 16, as has been well-known, the rested face can be directed so as to intersect the air flow passage 13 periodically or when necessity demands, with the result that the filter is prevented from being clogged and the filtering function can be utilized to the fullest.

The air, pro-treated by the dry filters 14 and 16, passes through the first filter 17. The first filter 17 is made of a filter material, woven with glass fiber, for example, of a finer-mesh than that of the auto-roll filter 16. More specifically, the first filter 17 has a filtering performance capable of removing 90% of NBS particles and this medium-performance filter 17 catches residual foreign substances that pass through the dry filters 14 and 16.

The air that passed the first filter 17 is cooled to not higher than the dew-point temperature of the air by the first cooling means 18 located downstream from the first filter 17 in the air passage 13. The first cooling means 18 may use a well-known cooling coil, for example. The first cooling means 18 with a cooling coil, cools the air to not higher than the dew-point point, has the moisture of the air condense into water on the cooling surface of the cooling means 18 and captures the water content including water-soluble gaseous substances from the air and also separately captures a liquid containing particulates of slightly-soluble chemical substances, such as aerosols and ions.

The liquid captured by the first cooling means 18 is discharged as waste liquid to the outside of the housing.

The air cooled to not higher than the dew-point temperature by the first cooling means 18 is purified by the wet-type removing mechanism 19.

The wet-type removing mechanism 19 includes first, second and third condensing and capturing means 23, 24 and 25 arranged mutually spaced apart in the flow direction of the air flow passage 13; first atomizing means 26 located between the first condensing and capturing means 23 and the second condensing and capturing means 24; and second atomizing means 27 located between the second condensing and capturing means 24 and the third condensing and capturing means 25.

The first atomizing means 26 includes a plurality of nozzle ports 28a and 28b arranged mutually spaced apart and facing each other in the direction of the air flow passage 13 between the atomizing means 23 and 24; a first liquid reservoir 31 for receiving a capturing liquid 30 supplied from a capturing liquid supply source 29; and a circulation pump 33 for supplying the capturing liquid 30 from the liquid reservoir through a duct 32 to the nozzle ports 28a and 28b.

The capturing liquid 30, sent from the first liquid reservoir 31 to the nozzle ports 28a and 28b by the circulation pump 33, is sprayed as a mist in the downstream direction from the nozzle ports 28a open to the downstream side. In opposition to this liquid flow, the capturing liquid 30 is sprayed in the upstream direction from the nozzle ports 28b open to the upstream side.

The atomized particles of the capturing liquid, as they come into contact with the air flow cooled to not higher than the dew-point temperature, capture chiefly water-soluble gaseous substances.

The atomized particles of the capturing liquid sprayed in opposite directions from the nozzle ports flow as counter flow in the air flow passage 13 and are mutually agitated in the air flow, thus increasing chances of contacting the air and facilitating the atomized capturing liquid's action of capturing water-soluble gaseous substances, so that the atomized capturing liquid captures part of slightly-soluble solid chemical substances.

The mist-state particles of the capturing liquid, which have captured water-soluble gaseous substances or slightly-soluble solid chemical substances, are condensed and captured as droplets by the first and second condensing and capturing means 23 and 24 located on either side of the first atomizing means 26. The condensing and capturing means 23 and 24 can be formed by well-known eliminators.

To improve the collection efficiency, it is desirable to use eliminators to high-speed specifications.

The capturing liquid containing impurities, condensed by the eliminators, is returned to the liquid reservoir 31. The capturing liquid 30 in the liquid reservoir 31 is recirculated between the liquid reservoir 31 and the nozzle ports 28a and 28b as long as its impurity concentration does not rise so high as to decrease the purifying performance. The lost amount of the capturing liquid 30 by vaporization or the like is replenished from a supply source 29 when necessary.

To prevent the captured gaseous substances in the liquid reservoir 31 from scattering back into the air, it is desirable to replenish the liquid reservoir with a certain amount of capturing liquid 30 when it is necessary.

In the illustrated example, the second atomizing means 27 includes a plurality of nozzle ports 34a and 34b arranged directed to the upstream side of the air flow passage 13 between the two condensing and capturing means 23 and 24; a second liquid reservoir 37 for receiving a capturing liquid 36 from a capturing liquid supply source 35; and a circulation pump 39 for supplying the capturing liquid 36 from the liquid reservoir through a duct 38 to the nozzle ports 34a and 34b.

The capturing liquid 36 in the second liquid reservoir 37, guided to the nozzle ports 34a and 34b by the circulation pump 39, is sprayed as a mist in two stages in the upstream direction from nozzle ports 34a and 34b respectively open to the upstream side.

The atomized particles of the capturing liquid, as in the case of the first atomizing means 26, when they contact the air flow cooled to not higher than the dew-point temperature, capture water-soluble gaseous substances and slightly-soluble solid chemical substances, which have not been captured by the atomized capturing liquid sprayed from the first atomizing means 26 and remain in the air.

The atomized particles of the capturing liquid from the second atomizing means 27 are condensed and captured chiefly by the third condensing and capturing means 25 formed, for example, by an eliminator as mentioned above and located downstream from the second atomizing means 27, and returned to the second liquid reservoir 37.

As with the capturing liquid 30 in the first liquid reservoir, the capturing liquid 36 in the liquid reservoir 37 can be used by recirculating between the liquid reservoir 37 and the nozzle ports 34a and 34b. The lost amount of the capturing liquid 36 by evaporation or the like is replenished from a supply source 35 when necessary.

To improve the capturing effect by the atomized capturing liquid sprayed by the nozzle ports 28a, 28b, 34a and 34b, the droplet diameter of the mist of the capturing liquid is preferably about 10 μm to 100 μm.

The liquid reservoirs 31 and 37 can be made to communicate with each other, and any one kind of water, industrial water, demineralized water, city water or well water, may be used.

However, a satisfying cleaning action can be achieved at a relatively low running cost by diving the liquid reservoir to the first reservoir 31 and the second reservoir 37 as shown in FIG. 1, using less expensive industrial water as the capturing liquid 30 in the first reservoir 31 and demineralized water with a high degree of purity as the capturing water 36 in the second reservoir 37, and having the two kinds of water recirculated separately.

When an aqueous solution of gaseous impurity substances, which are to be removed, is acid, an alkali solution that neutralizes this aqueous solution is preferably used as a capturing liquid to capture the gaseous substances concerned. In this case, it is desirable to use an alkali solution as the first capturing liquid 30 and demineralized water for a rinsing action as the second capturing liquid 36.

When an aqueous solution of gaseous impurity substances, which are to be removed, is alkali, an acid solution that neutralizes this aqueous solution is preferably used as the first capturing liquid 30.

Depending on the situation, an alkali solution can be used as the first capturing liquid 30 and an acid solution can be used as the second capturing liquid 36.

The air, which has been cleaned by the wet-type removing mechanism 19, if its temperature rises above the condensing temperature as it passes through the wet-type removing mechanism, is cooled again below the condensing temperature by the second cooling means 20.

The second cooling means 20, which is formed, for example, by a cooling coil as with the first cooling means 18, cools the air to not higher than its dew-point temperature, has the moisture of the air condense into water on its cooling surface and captures the water content including water-soluble gaseous substances that remain in the air and also separately captures a liquid containing residual particulates of slightly-soluble chemical substances, such as aerosols and ions.

The air that has passed the second cooling means 20 is eventually filtered by a second filter 22 and supplied to a desired place, such as a clean room.

The second filter 22 is a high-performance filter made of a filter material, woven with glass fiber, of a finer-mesh than that of the medium-performance filter 17, and has a filtering performance capable of removing 99.97% of DOP particles, for example.

The above-mentioned impurity-removing apparatus 10 according to the present invention is constructed by combining the wet-type removing mechanism 19 of a special configuration including countercurrent mist flow by the first atomizing means 26 with a wet-type filtering mechanism including the first and second filters 17 and 22. Therefore, this removing mechanism 10 is capable of removing not only dust particles and gaseous substances but also particles of chemical substances at a high removal rate.

FIG. 2 is a diagram for explaining an example of the cleaning performance of the impurity-removing apparatus 10 shown in FIG. 1.

The leftmost column of the table in FIG. 2 shows the composition of the chemical impurity substances to be removed. The names of the other columns arranged to the right direction are the concentration ($ng/m^3$) of chemical impurity substances contained in the outdoor air, the concentration ($ng/m^3$) of chemical impurity substances at the respective measuring positions (A~D) in the air flow passage 13, and the removal rates of the final chemical impurity substances.

In the table in FIG. 2, $Na^+$, $K^+$, $Ca^{2+}$, $Mg^{2+}$ and $B^+$ are solid chemical substances existing as ions or solid fine particulates, and $NH_4^+$, $Cl^-$, $NO_2^-$, $NO_3^-$, and $SO_4^{2-}$ are gaseous chemical substances existing as gases. The $Na^+$ and $K^+$ were measured by Atomic Absorption Spectrometry, $Ca^{2+}$ and $Mg^{2+}$ by ICP-OES, $B^+$ by ICP-MS, and $NH_4^+$, $Cl^-$, $NO_2^-$, $NO_3^-$ and $SO_4^{2-}$ by Ion Chromatography. The measuring point A shows measured values at the outlet point of the first filter 17, the measuring point B shows measured values at the outlet point of the cooling means 18, the measuring point C shows measured values at the outlet point of the second cooling means 20, and the measuring point D shows measured values at the outlet point of the second filter 22. The N.D in the table shows that the substance as the object of removal was not detected. The - mark means that measurement was not carried out.

The removal rate of each impurity substance was obtained by equation (1) in FIG. 2. Note that the flow velocity of the processing air in the air flow passage 13 was 4 m/sec. Demineralized water was used as the first capturing water 30 and the second capturing water 36.

As is clear from the table in FIG. 2, the gaseous substances $NH_4^+$, $Cl^-$, $NO_2^-$, $NO_3^-$ and $SO_4^{2-}$ could be removed at a high removal rate higher than 96%.

Out of the solid chemical substances, $Ca_2^+$ with the lowest removal rate could be removed at a removal rate higher than 84%.

With the other solid chemical substances, the removal rates were higher than 90%. Above all else, Na+ and K+ could be removed at a removal rate of 100%, which means that complete removal is possible.

With $Ca^{2+}$ that showed a relatively low removal rate, the removal rate is expected to improve by an adequate selection of the capturing liquid mentioned above.

According to the present invention, particulates of chemical substances as well as dust particles and gaseous substances can be removed, which has been made possible by a combination of the wet-type impurity-removing mechanism, the first and second filters, and the first and second cooling means, wherein the wet-type impurity-removing mechanism includes the first atomizing means for spraying the capturing liquid in opposite directions from the spray positions provided mutually spaced apart in the direction of the air flow passage.

What is claimed is:

1. A method for removing impurity substances in the air, comprising:
    guiding the air to be treated through a housing defining a flow passage; and
    atomizing a capturing liquid for capturing gaseous substances in the air, by means of an atomizer located in said flow passage, said atomizer having a first plurality and a second plurality of atomizing nozzle ports mutually spaced apart and facing each other in the direction of the flow passage;
    wherein said capturing liquid is one of an acid solution and an alkali solution.

2. A method for removing impurity substances in the air, comprising:
    guiding the air to be treated through a housing defining a flow passage; and
    atomizing a capturing liquid for capturing gaseous substances in the air, by means of an atomizer located in said flow passage, said atomizer having a first plurality and a second plurality of atomizing nozzle ports mutually spaced apart and facing each other in the direction of the flow passage;
    wherein the particle size of said capturing liquid atomized by said atomizer is substantially 10 $\mu$m to 100 $\mu$m.

3. A method for removing impurity substances in the air, comprising:
    guiding the air to be treated through a housing defining a flow passage;
    filtering the air to remove solid particles, by means of a first filter located in said flow passage;
    cooling the air to be treated below a dew-point temperature, by means of a first cooler located downstream from said first filter in said flow passage;
    atomizing a capturing liquid for capturing gaseous substances in the air cooled below a dew-point temperature, by means of a first atomizer having a first plurality and a second plurality of atomizing nozzle ports mutually spaced apart and facing each other in the direction of the flow passage;
    capturing an atomized liquid containing said gaseous substances, by means of first and second condensing and capturing assemblies located across said first atomizer and spaced apart from each other, said first one being upstream from and said second one being downstream from said first atomizer;
    atomizing a capturing liquid toward the upstream side of said flow passage to capture remaining gaseous substances in the air, by means of a second atomizer located downstream from said first and second condensing and capturing assemblies;
    capturing remaining atomized liquid containing said gaseous substances by means of a third condensing and capturing assembly located downstream from said second atomizer;
    cooling the air to not higher than a dew-point temperature thereof to condense said atomized liquid containing said gaseous substances remaining in the air, by means of a second cooler located downstream from said third condensing and capturing assembly in said flow passage; and
    filtering the air by means of a second filter located downstream from said second cooler in said flow passage and using a material denser than that of said first filter.

4. A method for removing impurity substances in the air according to claim 3, wherein said first and second atomizers atomize mutually different kinds of capturing liquid.

5. A method for removing impurity substances in the air according to claim 3, wherein said condensing and capturing assemblies are eliminators.

6. A method for removing impurity substances in the air according to claim 3, wherein the particle size of said capturing liquid atomized by each of said atomizers is substantially 10 $\mu$m to 100 $\mu$m.

7. A method for removing impurity substances in the air according to claim 3, wherein each of said coolers is a condenser coil.

8. A method for removing impurity substances in the air according to claim 3, wherein said capturing liquid atomized by said atomizers is used recirculated through said atomizers and said condensing and capturing assemblies.

9. A method for removing impurity substances in air being guided through a housing defining a flow passage, the method comprising:
    atomizing a first portion of a capturing liquid for capturing gaseous substances in the air, by means of a first plurality of atomizing nozzle ports facing in the direction of the flow passage; and
    atomizing a second portion of said capturing liquid by means of a second plurality of atomizing nozzle ports spaced apart from and facing the first plurality of atomizing nozzle ports;
    wherein said capturing liquid is one of an acid solution and an alkali solution.

10. A method for removing impurity substances in air being guided through a housing defining a flow passage, the method comprising:
    atomizing a first portion of a capturing liquid for capturing gaseous substances in the air, by means of a first plurality of atomizing nozzle ports facing in the direction of the flow passage; and
    atomizing a second portion of said capturing liquid by means of a second plurality of atomizing nozzle ports spaced apart from and facing the first plurality of atomizing nozzle ports;
    wherein the particle size of said capturing liquid atomized by said atomizer is substantially 10 $\mu$m to 100 $\mu$m.

* * * * *